April 8, 1941.  E. BRIGGS  2,237,861
PLANT LIFTER
Filed Feb. 27, 1940  2 Sheets-Sheet 1
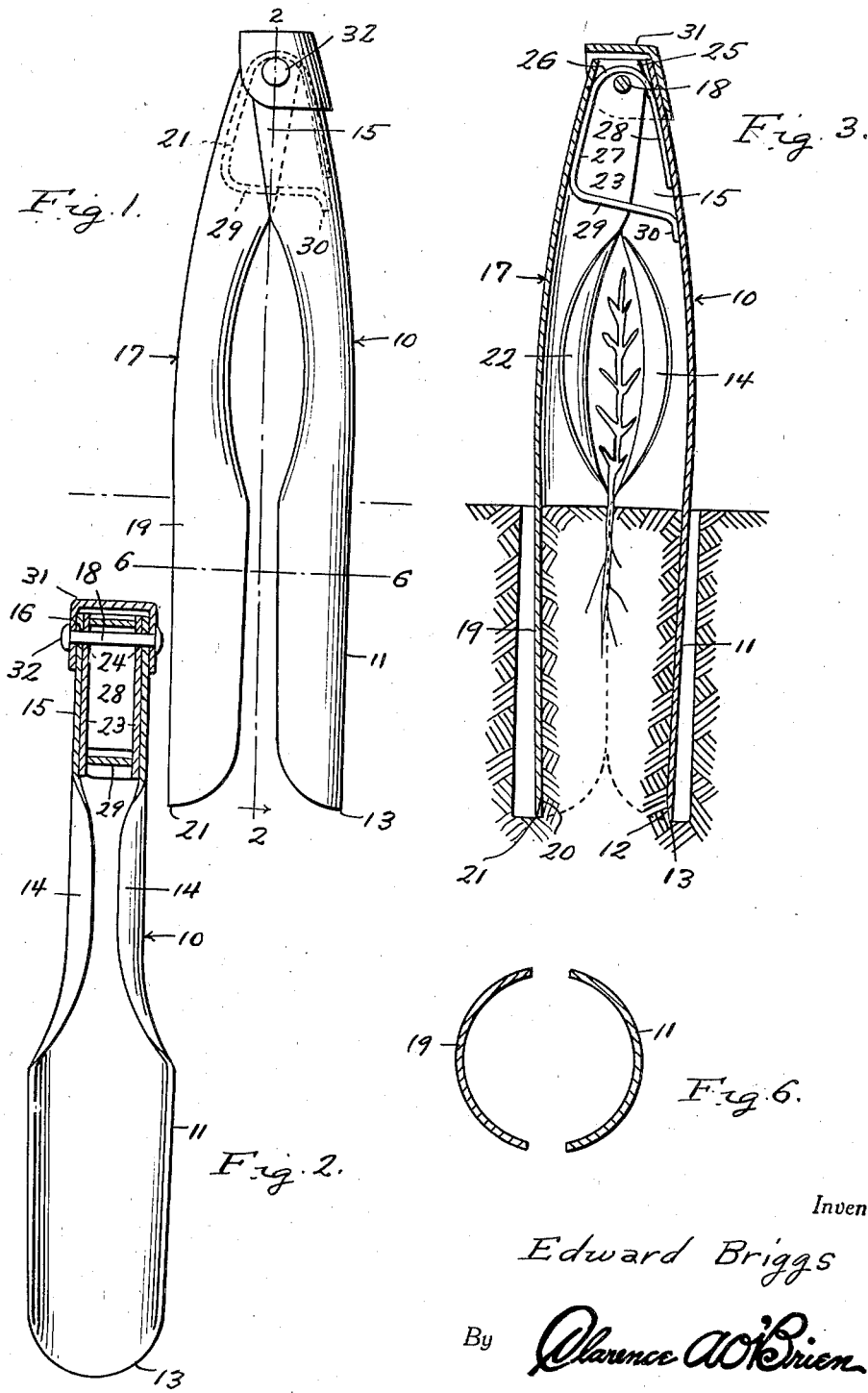
Inventor
Edward Briggs
By Clarence A. O'Brien
Attorney April 8, 1941.  E. BRIGGS  2,237,861
PLANT LIFTER
Filed Feb. 27, 1940  2 Sheets-Sheet 2
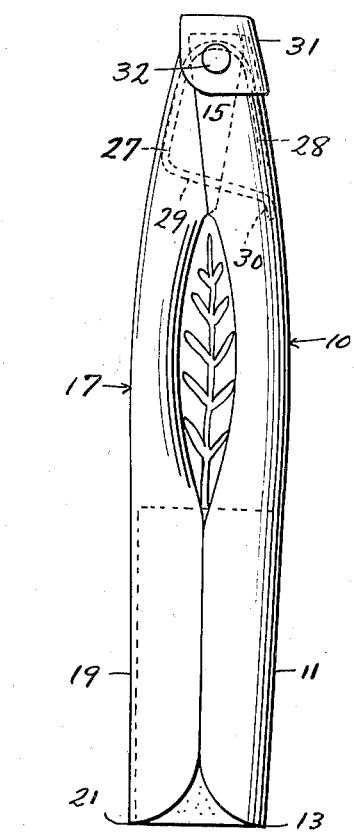
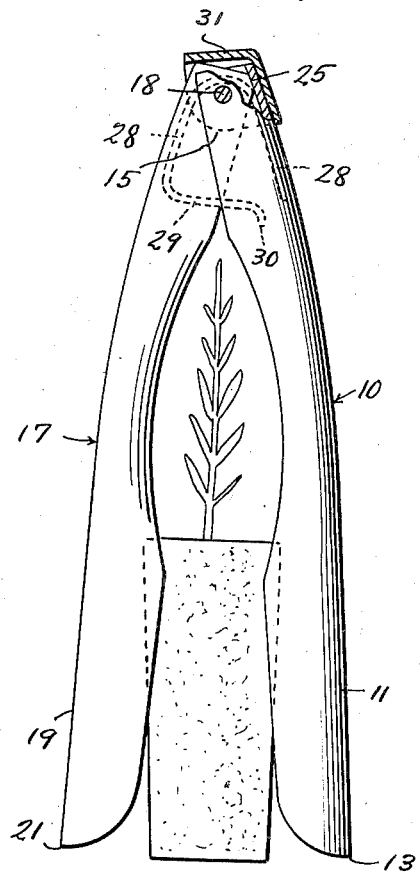
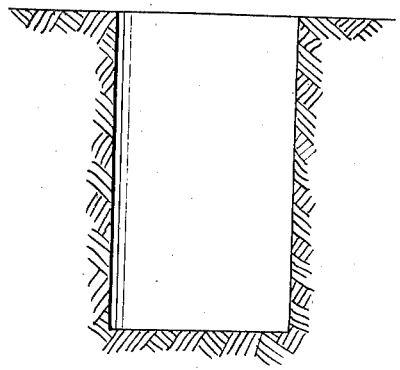
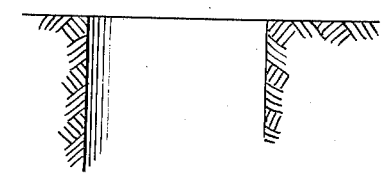
Inventor
Edward Briggs
By Clarence A. O'Brien
Attorney Patented Apr. 8, 1941

2,237,861

UNITED STATES PATENT OFFICE 2,237,861

PLANT LIFTER

Edward Briggs, Norwich, Conn.

Application February 27, 1940, Serial No. 321,113

1 Claim. (Cl. 294—50.7)

The present invention relates to new and useful improvements in plant lifters and has for its primary object to provide a device of this character which will lift and transfer plants with a maximum of ease.

Other objects of the invention are to provide a device of the aforementioned character which will be strong, durable, efficient and reliable in use, and which may be manufactured at low cost.

Still further objects and advantages of the invention will become apparent from a study of the following detailed description taken in connection with the accompanying drawings, wherein like characters of reference designate corresponding parts throughout the several views wherein—

Figure 1 is a side elevational view of a device embodying my invention.

Figure 2 is a vertical sectional view taken substantially on the line 2—2 of Fig. 1.

Figure 3 is a vertical sectional view of the device.

Figure 4 is a side elevational view of the device, shown with a plant held thereby.

Figure 5 is a side elevational view of the device, shown with a plant released therefrom.

Figure 6 is a transverse sectional view taken substantially on the line 6—6 of Fig. 1.

Referring now to the drawings in detail, it will be seen that the reference numeral 10 designates generally a lever, constructed of metal or other suitable material, which is curved from end to end. The bottom end portion of the lever 10 is curved transversely to provide a jaw 11 the bottom end of which is beveled as at 12 to provide a cutting edge 13. The top end portion of the lever 10 is bent to provide inwardly turned flanges 14 and check plates 15 which have openings 16 therethrough.

A lever 17 constructed substantially the same as the lever 10 is pivotally secured to the lever 10 through the medium of a pin 18. The lever 17 has its bottom end portion curved to provide a jaw 19 the bottom end of which is beveled as at 20 to provide a cutting edge 21. The top end portion of the lever 17 is bent to provide inwardly turned flanges 22 and cheek plates 23 which have openings 24 therein through which the pin 18 passes. The side edge portions of the cheek plates 23 of lever 17 above the pin 18 are cut at a bevel to provide stops 25 for abutting the top end of the lever 10 and the purpose of which will be subsequently set forth.

A substantially inverted U-shaped spring 26 is supported on the pin 18 with its arms 27 and 28 contacting the levers 10 and 17 and forcing the same apart to separate said levers in limited degree as determined by abutment of said stops 25 with said top end of lever 10. The arm 27 has a lateral extension 29 thereon the free end of which is curved as shown at 30.

A cap 31 is mounted over the top ends of the levers 10 and 17 and is held securely in place by the pin 18 which passes through holes in the cap 31.

The ends of the pin 18 are swaged as shown at 32.

The operation of the device is as follows:

As shown in Fig. 1 the device is grasped about the levers 10 and 17 at which time the levers are brought together until the lever 10 contacts the curved end 30 of the extension 29 on the spring arm 27. In this position the device is then inserted in the soil with the jaws 11 and 19 about the plant. The levers 10 and 17 are then swung toward each other to cause the jaws 11 and 19 to compress the soil about the plant at which time the plant and adjacent soil may be lifted and transferred. In this position the curved end 30 of the extension 29 slides down the inside face of the lever 10 to permit the jaws 11 and 19 to close, as shown in Fig. 3 of the drawings.

Although I have shown and described herein a preferred embodiment of my invention it is to be definitely understood that I do not desire to limit the application of the invention thereto, and any change or changes may be made in the materials and in the structure and arrangement of the several parts within the spirit of the invention as claimed.

What is claimed is:

A plant lifter for insertion in the ground comprising a pair of opposed clamping levers having top ends pivoted together for relative swinging of the levers into and from clamping relation, and lower jaw ends for clamping earth therebetween, a spring interposed between said levers and urging the same from clamping relation, said spring including a lateral extension bearing against one lever and slidably engaging the same to form a yielding stop for temporarily limiting relative swinging of said levers toward clamping relation and permitting further movement thereof toward such relation, and a cap on the top ends of said levers.

EDWARD BRIGGS.